Figure 1:
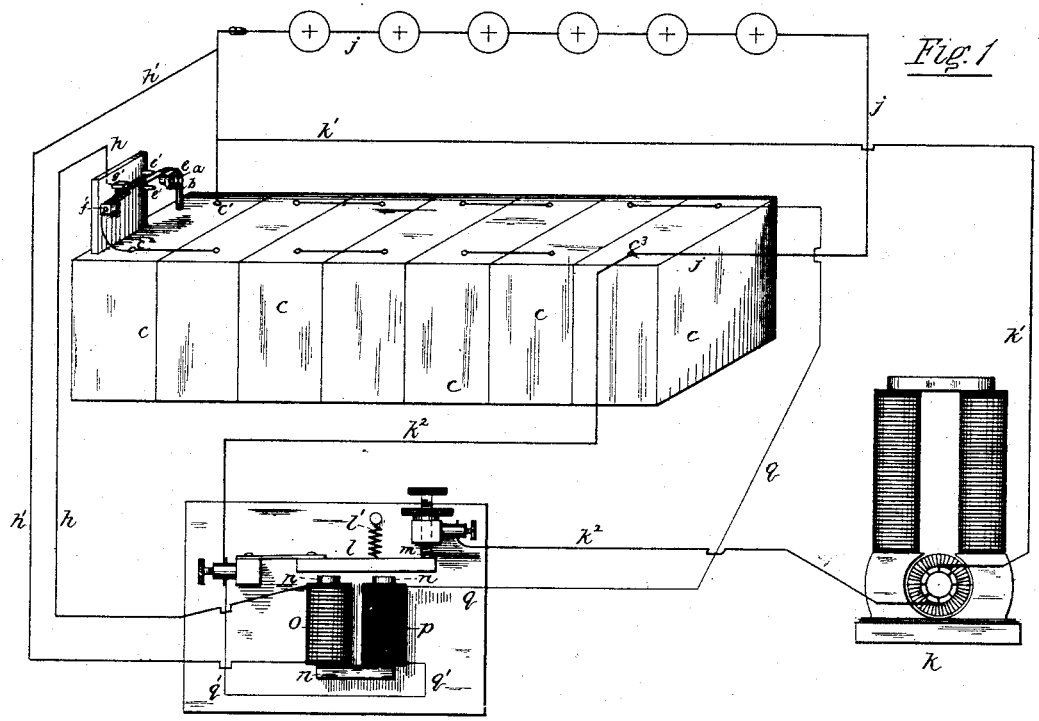

(No Model.)  2 Sheets—Sheet 1.

J. M. PENDLETON.
SYSTEM FOR CONTROLLING SECONDARY BATTERY CIRCUITS.

No. 343,392.   Patented June 8, 1886.

Witnesses
H. D. Williams
Chas L. Watson

John M. Pendleton
Inventor
per Alfred Hedlock
atty.

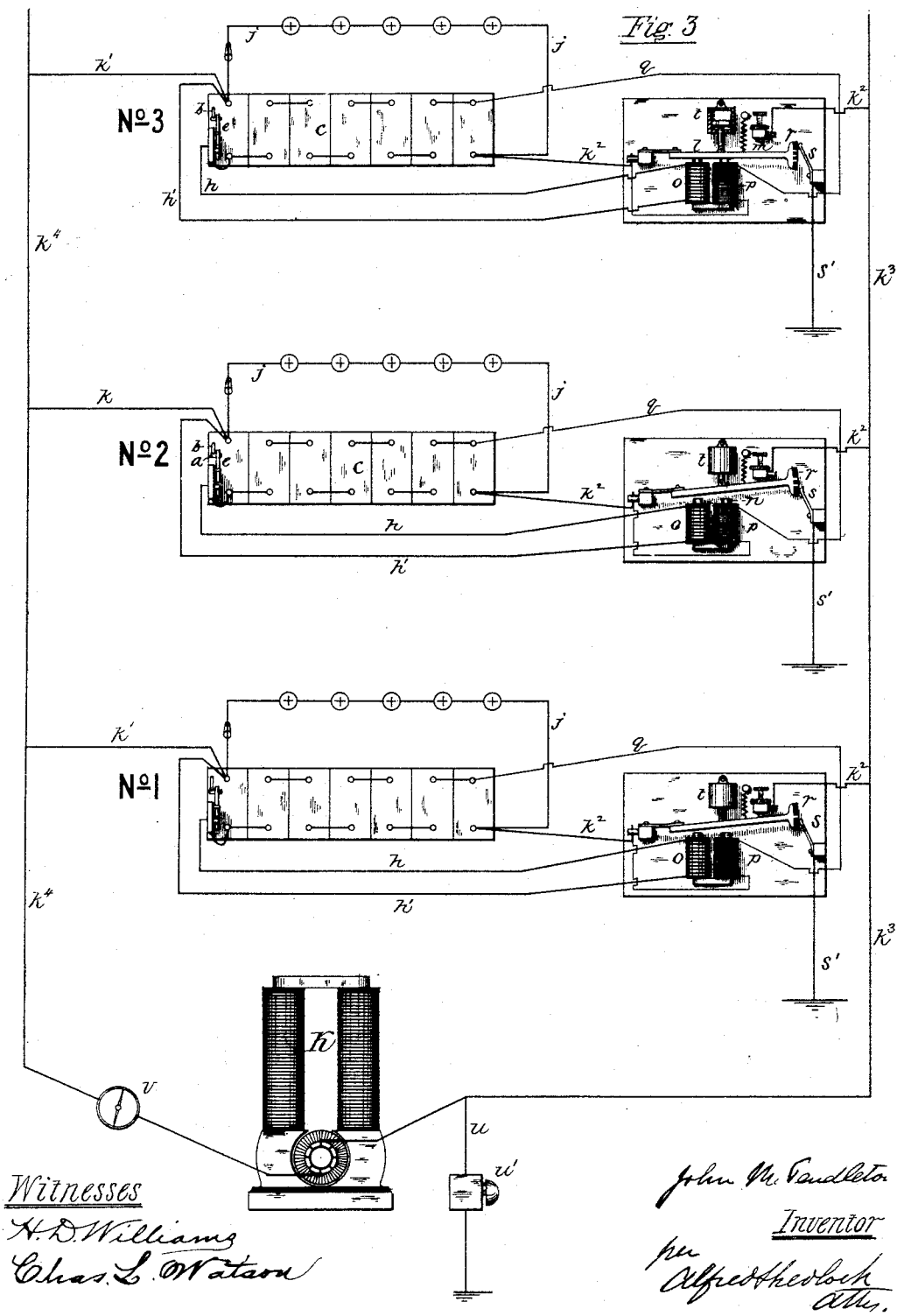

UNITED STATES PATENT OFFICE.

JOHN M. PENDLETON, OF NEW YORK, N. Y., ASSIGNOR TO THE EQUITABLE ELECTRIC COMPANY, OF SAME PLACE.

SYSTEM FOR CONTROLLING SECONDARY-BATTERY CIRCUITS.

SPECIFICATION forming part of Letters Patent No. 343,392, dated June 8, 1886.

Application filed December 21, 1885. Serial No. 186,286. (No model.)

*To all whom it may concern:*

Be it known that I, JOHN M. PENDLETON, a citizen of the United States, residing at New York, county and State of New York, have invented a certain new and Improved System for Controlling Secondary-Battery Circuits, of which the following is a specification.

It is a well-known fact that hydrogen generates heat when caused to impinge on a metal. In this circuit-controlling system for secondary batteries I take advantage of this fact by allowing the heat so generated to actuate a thermostat, which is constructed and arranged to close an electric circuit in communication with the charging-station, and thereby break the charging-circuit supplying current to the secondary batteries, or to give notice to the attendant when an excess of current is supplied or the batteries are fully charged. The hydrogen used for this purpose is that which is evolved at one of the suboxide plates of the battery.

In the simple application of the principle involved in this invention the thermostat actuated by the heat generated by the hydrogen escaping from the electrode is caused to close a circuit which may be supplied with current from the battery itself, and in this circuit is included an alarm or indicator located near the charging dynamo-electric machine, so that the attendant can, upon notice, direct a part or the whole of the current from the battery-circuit; but in most cases I prefer to make the apparatus automatic in its action; and to this end I include in the circuit operated by the thermostat the coil of an electro-magnet, the armature of which, when attracted by the current flowing through the thermostatic circuit, is caused to break the charging-circuit of the dynamo-electric machine. Now, as the thermostat, by cooling, will react on its circuit-closer when the supply of current is cut off, which will take place as soon as the charging-current stops, the armature would, by its retractile spring, be drawn away from the magnet and again close the charging-circuit; but as this reclosing of the charging-circuit should not occur until the secondary battery has discharged to about the limit of its practical working electro-motive force, I provide a simple means for holding the armature down, which consists of a fine-wire coil surrounding the core of the magnet and connected to the terminals of one of the cells or parts of the secondary batteries. The resistance of said coil and circuit is such that only sufficient current flows through it to hold the armature down when the electro-motive force of the battery is between its working limits, the amount of current required for this purpose being a very small percentage of the capacity of the cell or part of the battery. As soon as the electro-motive force of the battery approaches its minimum working limit, the current flowing through this high-resistance coil is insufficient to cause the magnet to hold the armature, which, moving away from the magnet, again closes the charging-circuit.

Figure 2:
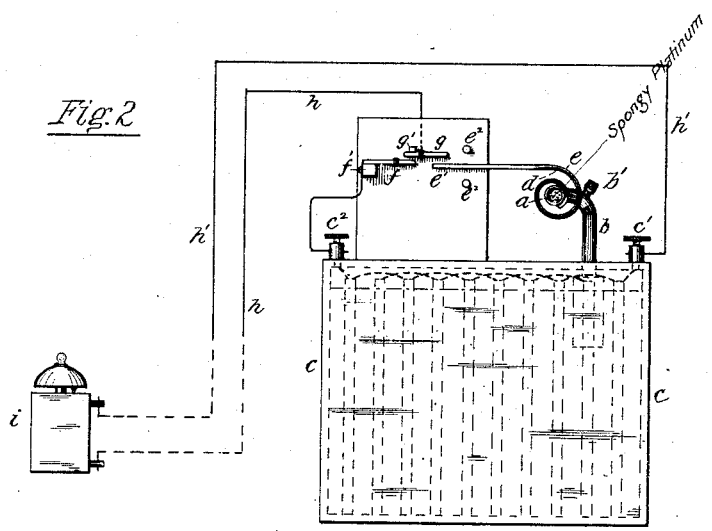

In the accompanying drawings, Figure 1, Sheet 1, represents my improved circuit-controller applied to the charging-circuit of a secondary battery. Fig. 2, Sheet 1, is an enlarged view of the thermostatic cut-out; and Fig. 3, Sheet 2, represents the application of my thermostatic cut-out to a number of batteries charged from a central station.

The improved thermostatic cut-out devised by me is clearly shown in Fig. 2. It consists of a mass of spongy platinum held in the open-end tube, $a$, which, by the tube $b$, is brought into communication with a part of the interior of the battery $c$, where hydrogen is generated by providing the lower end of the tube $b$ with an inverted cup placed over the upper end of one of the plates, which is a suboxide or negative plate when the charging current is flowing through the battery from the binding-post $c'$ to the binding-post $c^2$. Attached to the tube $a$, and surrounding it in the form of a coil, is the thermostat composed of two strips of different metals, $d$ and $e$, so selected that the coefficient of expansion of the inside strip, $d$, shall be greater than that of the outer strip, $e$. The coil $d\,e$ will consequently tend to open when acted upon by the heat generated in the tube $a$.

$b'$ represents an adjustable escape or throttle vent to act as a regulator.

The cut-out actuated by the thermostat consists of a lever, $f$, having its fulcrum so related to its mass that one end of it rests on the stop $f'$, connected by a wire to the terminal $c^2$ of the battery, and the lever $g$ similarly constructed and arranged, so that its light end bears against the stop $g'$, clear of the lever $f$. The end $e'$ of the thermostat is located below the heavy end of the lever $g$, but away from it when the apparatus is in normal condition.

$e^2 e^2$ are stops for limiting the play of the free end of the thermostat.

The thermostatic operated circuit comprises the wire $h$ from the lever $g$ and the wire $h'$ from the terminal $c'$ of the battery, and in this circuit is shown the call or indicator $i$, which may be at any convenient place at any distant locality, to give notice to the attendant of the dynamo-electric machine that the battery is being overcharged or is fully charged. The operation of this part of the invention is as follows: When the heat generated in the tube $a$ affects the thermostatic coil $d\,e$, the end $e'$ moves and strikes the heavy end of the lever $g$, lifting it and causing its light end to come in contact with the lever $f$, thereby closing the circuit from $c'$ to $c^2$, through the line $h'$, call or indicator $i$, line $h$, lever $f$, and stop $f'$; but this closing of the circuit is only momentary, allowing enough current to flow to actuate the instrument $i$, for as the end $e'$ of the thermostat continues to move, the lever $g$ causes the lever $f$ to break the circuit at $f'$. This prevents an unnecessary waste of current, as the thermostat, if arranged to act directly on the circuit-contact, would, by reason of its slowness of action, keep the circuit closed a considerable length of time and cause an unnecessary waste of stored energy. It will also be observed that the thermostat is not included in the circuit, and is therefore unaffected by the heat of the current.

I will now, by referring to Fig. 1, describe the appliances employed by me in automatically operating charging-circuits of secondary batteries. The thermostatic cut-out $a\,b\,d\,e\,f\,g$ is applied to the cell $c$ of the battery. The working-circuit $j$ passes from the terminal $c'$ of this cell to the opposite terminal, $c^3$, of the last cell of the battery, and the dynamo-electric machine $k$ is also connected to these terminals by the lines $k'\,k^2$, respectively. In the line $k^2$ is included the armature $l$ and contact-stop $m$ of the electro-magnetic cut-out, on the cores $n$ of which are placed the coils $o$ and $p$. The coil $o$, which is of comparatively coarse wire, is included in the circuit $h\,h'$ of the thermostatic cut-out, and the coil $p$, which is of fine wire of high resistance, is placed in circuit with one of the cells or part of the battery—as the last cell—by the line $q$, which joins one end of it to one terminal of the cell, and the line $q'$ the other end of it to the part $k^2$ of the dynamo-circuit, which passes to the other terminal of the last cell from the armature $l$.

The current required to cause the coil $p$ to perform its proper function is so small as not to appreciably affect the proper working of the battery, the magnetization of the core due to said current being only sufficient to hold the armature down away from the stop $m$ after it has been drawn down to that position by the current of the circuit $h\,h'$, caused momentarily to pass through the coil $o$, by the action of the thermostat, as before described. Now, assuming the parts to be in the position shown in the drawings—the dynamo-electric machine charging the battery—as soon as hydrogen is evolved from the cell $c$, as before described, the thermostat operates and closes the circuit $h\,h'$ at $f$ and $g$, and the current from this cell, flowing through the coil $o$, causes the magnet $n$ to attract its armature $l$, thereby breaking the circuit of the dynamo-electric machine at the stop $m$. The secondary battery now alone supplies current to the working-line $j$, sufficient current flowing through the high-resistance coil $p$ to cause the magnet to hold its armature $l$ against the action of its retractile spring $l'$; but when the electro-motive force of the battery falls to about its minimum normal working limit, sufficient current does not flow through the coil $p$ to cause the magnet to overcome the resilience of the spring $l'$, and consequently the armature is thereby withdrawn from the magnet and again closes the dynamo-electric-machine circuit at $m$.

When several batteries are connected in multiple arc and charged from a dynamo-electric machine at a central station, thermostatic cut-outs made according to my invention may be applied to them, as shown at Fig. 3, so that when either of the batteries becomes fully charged it is cut out of the circuit and notice automatically sent to the charging or central station, giving the number of the battery or station so cut out. The batteries and automatic controlling apparatus and the arrangement of the circuits are, with the exception of a slight addition to the circuit-closer similar to the apparatus and circuits shown in Fig. 1, and corresponding parts at the three sub-stations shown, are marked with letters similar to those of Fig. 1. It is therefore unnecessary to again describe the construction and operation of the same. The principal addition made is a commutator formed on the end of the armature $l$, against which bears a contact-spring, $s$, connected by line $s'$ to earth. The commutators $r$ have different numbers of metallic projections at each of the stations, No. 1 having one point of contact with the spring $s$, as the armature is moved to or from the magnet $n$, No. 2 two points of contact, and so on.

To cause a perceptible interval of time to occur between the makes and breaks of the commutators $r$ with their springs $s$, the armatures $l$ are connected to the moving pistons of dash-pots $t$. The charging-lines $k'$ of the batteries all join the main $k^4$ from the charging-machine $k$ at the central station, and one of the mains, as $k^3$, is connected at the central station to earth by the line $u$, in which is included the indicator or call apparatus $u'$. An ammeter or other current-indicator, $v$, may be inserted in one of the mains to indicate the amount of current flowing through the mains and the condition, resistance, or number of multiple circuits taking current.

By referring to the previous description of my automatic controller the operation of the controllers here shown will be readily understood. The condition of the instrument at station No. 3 shows that the charging-current has been cut off by the armature $l$, which has been moved away from the stop $m$; but in so moving, the spring $s$ has made metallic contact with the armature $l$ three times, each tooth closing the earth-circuit through the part of the line $k^2$ from armature $l$ to one terminal of the battery, from the other terminal of the battery by line $k'$ to main $k^3$ through the machine $k$, and through the indicator or call apparatus $u'$ by the line $u$ to earth, thereby actuating the call apparatus three times, which notifies the attendant that station No. 3 is cut off, so that he can adjust the current to meet the requirements of the lines now in circuit. Now, when the circuit at $l$ $m$ of station No. 3 is again closed, three electrical impulses flow over the earth-circuit and actuate the call apparatus $u'$, notifying the attendant that said station is again drawing current from the main, so that he may again adjust the current, and also ascertain the time during which the sub-stations are receiving current from the main, by keeping a record of the signals indicated by the call apparatus $u'$. The opening and closing signals being somewhat different, may be readily distinguished from each other.

Having now described my invention, what I claim, and desire to secure by Letters Patent, is—

1. In an apparatus for controlling secondary-battery circuits, the combination, with the battery and its charging-circuit, of a heat-generator excited by gas escaping from the battery, a thermostat actuated by the heat-generator, and a circuit-breaker or cut-out in the charging-circuit actuated by a current allowed to flow by the thermostat.

2. In an apparatus for controlling secondary-battery circuits, the combination, with the battery and its charging-circuit, of a heat-generator excited by gas escaping from the battery, a thermostat actuated by the heat-generator, a circuit-breaker or cut-out in the charging-circuit actuated to open the charging-circuit by a current allowed to flow by the thermostat when the battery is charged, and a closed circuit from a part of the battery so connected to be cut out that the current flowing through said closed circuit retains the cut-out in open position until the electro-motive force of the battery reaches its lower working limit.

3. In an apparatus for controlling secondary-battery circuits, in combination, a secondary battery, a heat-generator composed of spongy platinum, a gas-tube located over a suboxide plate of the battery, a thermostat surrounding the heat-generator, a circuit-closer actuated by the thermostat and included in circuit with a coil on an electro-magnet, a dynamo-electric machine connected to the battery, and circuit-closer included in its circuit and actuated by the armature of the electro-magnet, substantially as set forth.

4. In an apparatus for controlling secondary-battery circuits, in combination, a secondary battery, a thermostatic cut-out actuated by heat generated by hydrogen given off from the elements of the battery, an electro-magnet, a coil surrounding the same included in circuit with the thermostatic cut-out, a coil of high resistance, also surrounding the electro-magnet and included in a closed circuit with part of the secondary battery, and a cut-out in the charging-circuit actuated by the armature of the electro-magnet, substantially as set forth.

5. In an apparatus for controlling secondary-battery circuits, in combination, the secondary battery $c$, heat-generator $a\,b$, thermostat $d\,e\,e'$, lever $g$, lever $f$, stop $f'$, upon which the end of the lever $f$ rests, said stop being connected to one terminal of the battery, and the indicating-circuit $h\,h'$, connected by part $h$ to lever $g$, and by part $h'$ to the other terminal of battery, substantially as set forth.

6. In an apparatus for controlling the charging-circuits of two or more secondary batteries, in combination with each of the batteries, an electro-magnet energized by currents from the battery when the battery is being overcharged or is fully charged, a cut-out in the charging-main actuated by the armature of the electro-magnet, a normally-open line, an indicating circuit-closer therein actuated by the armature of the electro-magnet, and a call apparatus or indication-receiver at the central station by which distinctive signals are transmitted from the batteries to the central station when their respective charging-circuits are opened or closed, substantially as set forth.

In witness whereof I have hereunto set my hand at New York, county and State of New York, this 19th day of December, 1885.

JOHN M. PENDLETON.

Witnesses:
 ALFRED SHEDLOCK,
 H. D. WILLIAMS.